United States Patent
Ikeda

(10) Patent No.: US 10,484,553 B2
(45) Date of Patent: Nov. 19, 2019

(54) DEVICE FOR ANALYZING A DISTURBANCE OF A FACSIMILE COMMUNICATION DEVICE AND NON-TRANSITORY RECORDING MEDIUM STORING A COMPUTER READABLE PROGRAM

(71) Applicant: KONICA MINOLTA, INC., Chiyoda-ku, Tokyo (JP)

(72) Inventor: Kazunori Ikeda, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/015,777

(22) Filed: Jun. 22, 2018

(65) Prior Publication Data

US 2019/0058802 A1    Feb. 21, 2019

(30) Foreign Application Priority Data

Aug. 17, 2017   (JP) ................................. 2017-157648

(51) Int. Cl.

| | |
|---|---|
| *G06F 3/12* | (2006.01) |
| *H04N 1/00* | (2006.01) |
| *H04M 1/654* | (2006.01) |
| *H04M 9/00* | (2006.01) |

(52) U.S. Cl.
CPC ...... *H04N 1/00488* (2013.01); *H04M 1/6545* (2013.01); *H04M 9/00* (2013.01)

(58) Field of Classification Search
None
See application file for complete search history.

(56) References Cited

U.S. PATENT DOCUMENTS

| | | | | |
|---|---|---|---|---|
| 2005/0286072 | A1* | 12/2005 | Norris | ............... H04N 1/32704 358/1.15 |
| 2008/0043938 | A1* | 2/2008 | Yasuda | ............... H04M 1/6505 379/88.08 |
| 2015/0036809 | A1 | 2/2015 | Maruyama | |
| 2018/0124275 | A1 | 5/2018 | Watanabe et al. | |

FOREIGN PATENT DOCUMENTS

| | | |
|---|---|---|
| CN | 104348991 | 2/2015 |
| JP | 2007-174061 A | 7/2007 |
| JP | 2007174061 A * | 7/2007 |

OTHER PUBLICATIONS

First Office Action issued in corresponding Chinese Patent Application No. 201711018618.0, dated Jan. 31, 2019, with English Translation (20 pages).

* cited by examiner

*Primary Examiner* — Henok Shiferaw
(74) *Attorney, Agent, or Firm* — Buchanan Ingersoll & Rooney PC

(57) ABSTRACT

Disclosed is a communication disturbance analysis device, including: a hardware processor that: obtains a first recorded data created by recording a first communication sound at a transmitter in one facsimile communication and a second recorded data created by recording a second communication sound at a receiver in the one facsimile communication, detects a silence section from each of the first recorded data and the second recorded data; and specifies an extracted section to be extracted as a recoded data to be analyzed from the first recorded data and the second recorded data in accordance with the detected silence section.

20 Claims, 18 Drawing Sheets

53

| ID | TRANSMITTER/ RECEIVER | SIGNAL TO BE MEASURED | SILENCE SECTION ||
| | | | START TIMING | END TIMING |
|---|---|---|---|---|
| 1 | TRANSMITTER | TSI/DCS | 12.0 s | 15.5 s |
| | RECEIVER | CSI/DIS | 10.0 s | 14.0 s |
| | RESET | EXTRACTED SECTION | 10.0 s | 15.5 s |

| ID | TRANSMITTER/ RECEIVER | SIGNAL TO BE MEASURED | SILENCE SECTION ||
|---|---|---|---|---|
| | | | START TIMING | END TIMING |
| 1 | TRANSMITTER | TSI/DCS | 12.0 s | 15.5 s |
| | RECEIVER | CSI/DIS | 10.0 s | 14.0 s |
| | RESET | EXTRACTED SECTION | 12.0 s | 14.0 s |

| ID | TRANSMITTER/ RECEIVER | SIGNAL TO BE MEASURED | SILENCE SECTION | |
|---|---|---|---|---|
| | | | START TIMING | END TIMING |
| 1 | TRANSMITTER | TSI/DCS | 1 2. 0 s | 1 5. 5 s |
| | RECEIVER | CSI/DIS | 1 0. 0 s | 1 4. 0 s |
| | RESET | EXTRACTED SECTION | 1 0. 0 s | 1 5. 5 s |
| | EXTENDED | EXTRACTED SECTION | 9. 5 s | 1 6. 5 s |

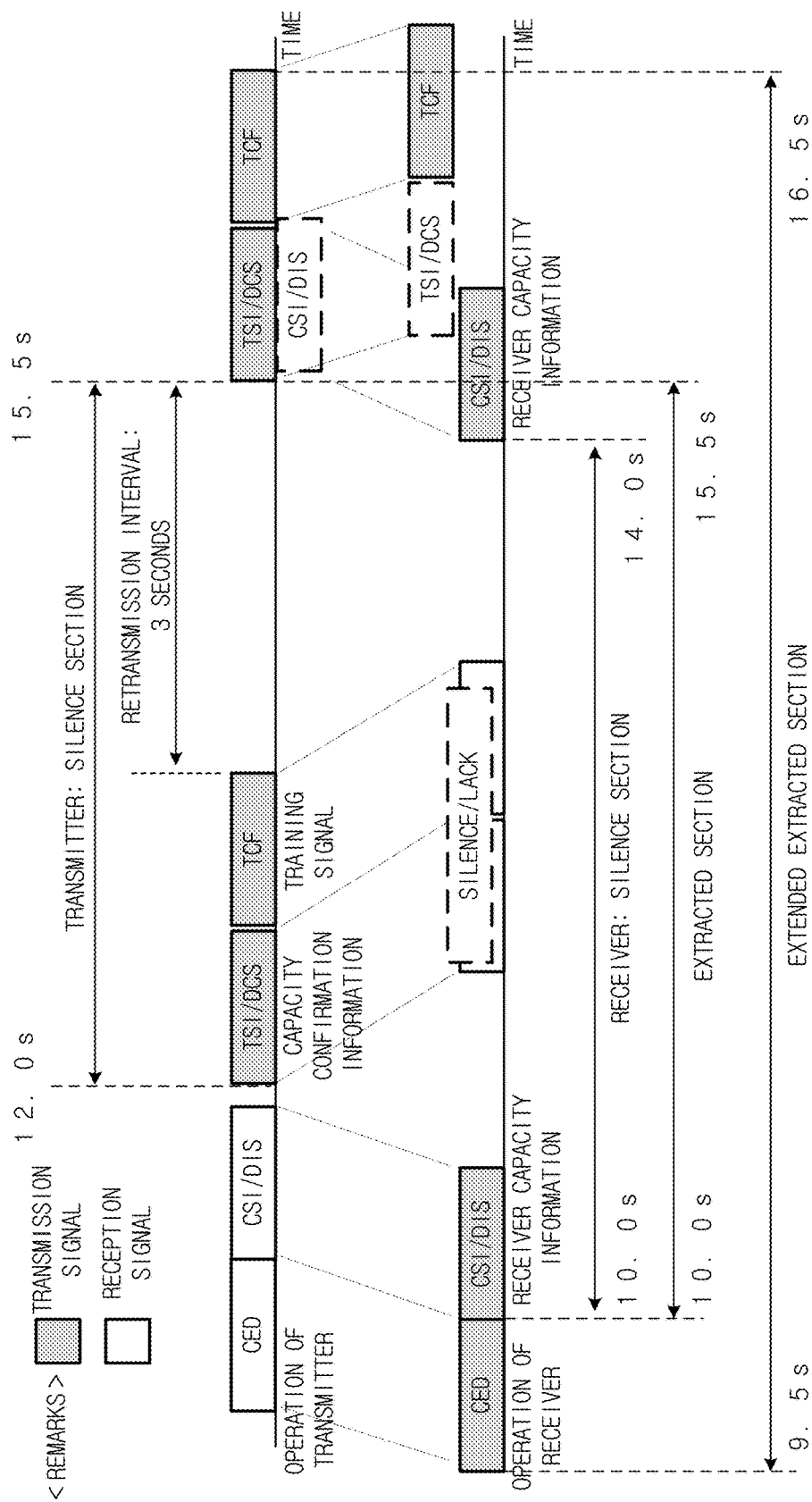

FIG.11

| ID | TRANSMITTER /RECEIVER | SILENCE SECTION 1 ||| SILENCE SECTION 2 |||
| | | SIGNAL TO BE MEASURED | START TIMING | END TIMING | SIGNAL TO BE MEASURED | START TIMING | END TIMING |
|---|---|---|---|---|---|---|---|
| 1 | TRANSMITTER | TSI/DCS | 12.0 s | 15.5 s | TSI/DCS | 22.0 s | 25.5 s |
| | RECEIVER | CSI/DIS | 10.0 s | 14.0 s | CSI/DIS | 20.0 s | 24.0 s |
| | RESET | EXTRACTED SECTION | 10.0 s | 15.5 s | EXTRACTED SECTION | 20.0 s | 25.5 s |

| ID | TRANSMITTER /RECEIVER | SILENCE SECTION 1 |||
| | | SIGNAL TO BE MEASURED | START TIMING | END TIMING |
|---|---|---|---|---|
| 1 | TRANSMITTER | TSI/DCS | 12.0 s | 15.5 s |
| | RECEIVER | CSI/DIS | 10.0 s | 14.0 s |
| | RESET | EXTRACTED SECTION | 10.0 s | 15.5 s |

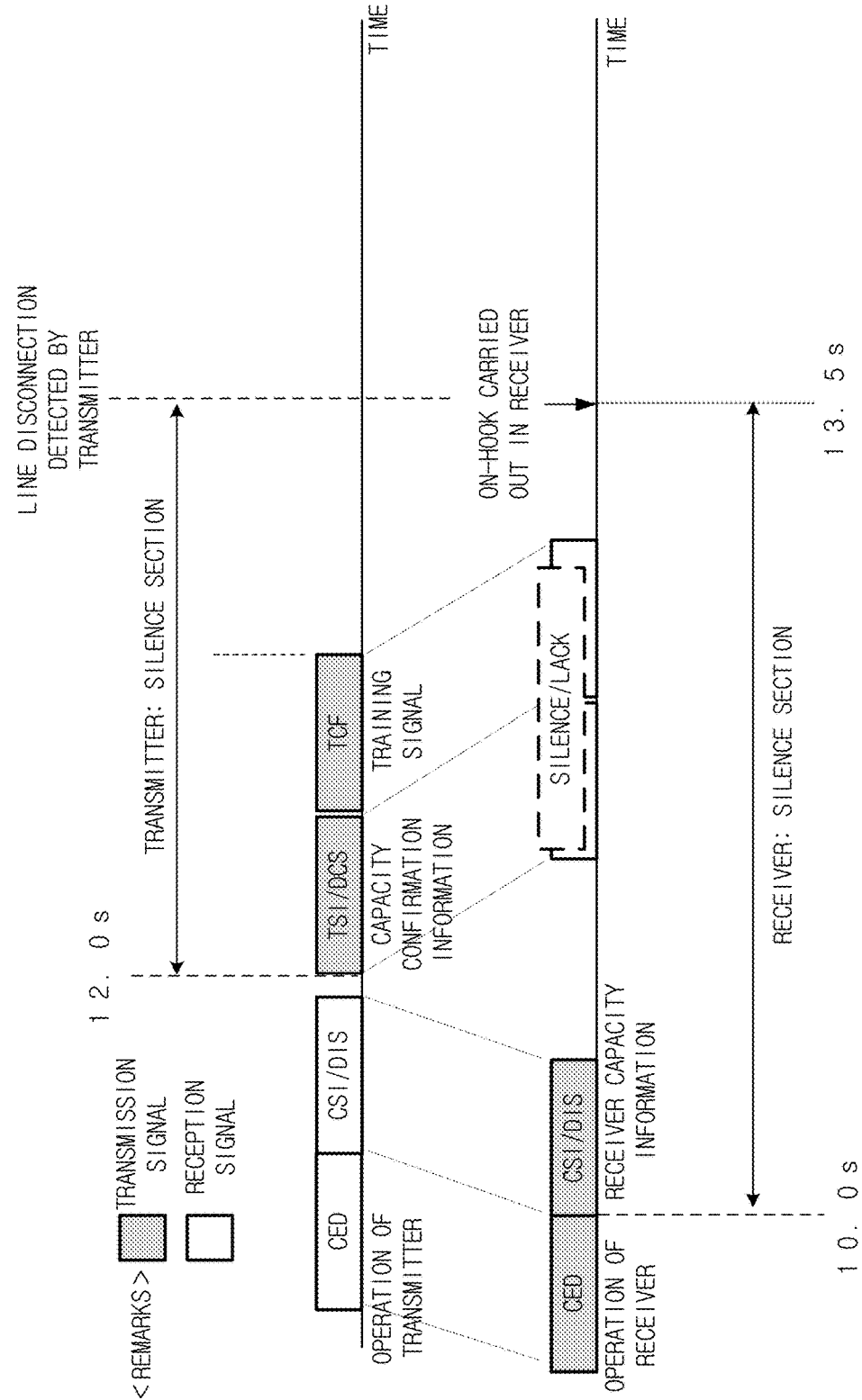

<DISTURBANCE EXAMPLE>
• DATA IS ACCUMLATED IN BUFFER → DELAYED
• ECHO CANCELLER → THERE ARE SOME CASES IN WHICH DATA IS LACKED
• OTHERS : DATA MODIFICATION, T.38 RELAY

DEVICE FOR ANALYZING A DISTURBANCE OF A FACSIMILE COMMUNICATION DEVICE AND NON-TRANSITORY RECORDING MEDIUM STORING A COMPUTER READABLE PROGRAM

Japanese Patent Application No. 2017-157648 filed on Aug. 17, 2017, including description, claims, drawings, and abstract the entire disclosure is incorporated herein by reference in its entirety.

BACKGROUND

Technological Field

The present invention relates to a communication disturbance analysis device and a non-transitory recording medium storing a computer readable program for analyzing the disturbance of the facsimile communication in accordance with the recorded data of the communication sound.

Description of the Related Art

As the communication environment of the facsimile communication, the IP telephone network in which the network is interposed by the exchanges, such as IP-PBX (Internet Protocol Private Branch eXchange), various types of Network-Gateway devices, TA (Terminal Adapter) and the like, has been increased. In the IP telephone network, there are many cases in which the signals are processed by the exchanges. FIG. 14 shows the part in which the sound data is processed in the IP telephone network. FIG. 15 shows the delay in the signal transmission in the IP telephone network.

As a specific case in which the signal is processed, it is generally known that when the exchangers (TA/PBX/GW) which are provided in the middle of the paths detect the FAX signal (FAX terminal identification tone of the transmitter side: CNG; FAX terminal identification tone of the receiver side: CED/ANSam), the operation mode of each exchanger is switched, such as the sound data is transmitted after the sound data is accumulated in the buffer. It is confirmed that the delay in the signal or the lack of the signal is caused (the silence section is caused) due to the switch of the mode and the communication error is caused.

In the facsimile communication, the mechanism for causing the communication error due to the delay in the signal or the lack of the signal will be explained as compared with the normal case in which the delay in the signal or the lack of the signal is not caused.

FIG. 16 shows the normal communication procedure (communication sequence). In this procedure, the phase B which is the phase after the communication is established, will be explained. The receiver transmits the receiver capacity information (CSI (Called Subscriber Identification)/DIS) indicating the capacity of the receiver (the resolution, the size of the original, the maximum communication speed and the like) to the transmitter.

The transmitter which receives the receiver capacity information, determines the communication mode, such as the resolution and the like, in accordance with the transmission condition which is set to the transmitter (the communication speed, the resolution and the like), the capacity of the receiver, which is recognized from the receiver capacity information, and the like. Then, the transmitter transmits the capacity confirmation information (TSI (Transmitting Subscriber Identification)/DCS (Digital Command Signal)) indicating the determined communication mode to the receiver.

Further, the transmitter transmits the training signal (TCF) for confirming the condition of the communication line, to the receiver.

The signals which are transmitted from the receiver to the transmitter and the signals which are transmitted from the transmitter to the receiver are delayed to a certain degree while the signals are transmitted via the communication line, and reach the facsimile device of the opposite side.

The receiver confirms the condition of the communication line by receiving the training signal. When the receiver recognizes the finish of the transmission of the training signal, the receiver transmits the training result to the transmitter. For example, in case that the receiver normally receives the training signal and finishes the preparation for receiving the data, the receiver transmits the CFR (Confirmation To Receive) signal as the training result. On the other hand, the receiver fails in the training, the receiver transmits the FTT signal.

In case that the transmitter receives the CFR signal as the training result from the receiver before the predetermined retransmission interval (3 seconds) elapses since the transmission of the training signal is finished, the transmitter finishes the phase B and transfers to the phase C to transmit the image data.

FIG. 17 shows an example of the case in which the transmitter cannot receive the training result from the receiver before the retransmission interval elapses. In FIG. 17, the delay caused in the communication line is more than that of FIG. 16. Therefore, the training result (CFR) transmitted from the receiver to the transmitter reaches the transmitter after the retransmission interval (3 seconds) elapses since the transmitter finishes the transmission of the training signal. Because the transmitter cannot receive the training result from the receiver before the retransmission interval elapses (because the silence section in which the intended signal is not received from the receiver is caused), the transmitter retransmits the capacity confirmation information (TSI/DCS) and the training signal (TCF). Because the CFR signal transmitted from the receiver reaches the transmitter when the transmitter retransmits the capacity confirmation information and the training signal, the transmitter cannot receive the CFR signal. As a result, the communication error is caused.

In FIG. 18, because the capacity confirmation information (TSI/DCS) and the training signal (TCF) which are transmitted from the transmitter are lacked in the IP telephone network, the silence section which exceeds the retransmission interval for the receiver capacity information (CSI/DIS signal) is caused in the receiver. As a result, the receiver retransmits the receiver capacity information (CSI/DIS signal) to the transmitter. Because the transmitter cannot receive the training result from the receiver before the retransmission interval elapses (because the silence section which exceeds the retransmission interval is caused), the transmitter retransmits the capacity confirmation information (TSI/DCS) and the training signal (TCF). In the transmitter, the retransmitted capacity confirmation information collides with the receiver capacity information (CSI/DIS signal) which is retransmitted by the receiver. Therefore, the transmitter cannot identify the receiver capacity information (CSI/DIS signal). Further, in also the receiver, the collision between the signals is caused. Therefore, the receiver cannot identify the capacity confirmation information (TSI/DCS) and the training signal (TCF) which are retransmitted by the transmitter. As a result, the communication error is caused.

In case that the disturbance is caused due to the delay in the signal in the IP telephone network as described above, it is difficult to specify the cause of the disturbance by the analysis using the protocol trace or the analysis using the sound data obtained from only one of the transmitter and the receiver. Therefore, in general, the communication sound is recorded in each of the transmitter and the receiver when the disturbance is caused, and the cause of the disturbance is analyzed by actually listening to recorded sound data to compare them.

In Japanese Patent Application Publication No. 2007-174061, the following control method for stopping the facsimile communication is disclosed. In the facsimile communication using the IP telephone network, when the silence section is caused due to the increase in the traffic load of the provided exchangers, because the retransmission request is increased and communication time becomes long, the facsimile device is occupied by the communication process. In order to solve this trouble, in this control method, the silence section is detected by a filter circuit. When the number of the detected silence sections exceeds the predetermined number, the facsimile communication is stopped.

In the method for analyzing the cause of the disturbance by actually listening to and comparing the recorded data of the communication sound in each of the transmitter and the receiver when the disturbance is caused, an operator must listen to the long recorded data and the analysis work is increased.

In the method disclosed in Japanese Patent Application Publication No. 2007-174061, by stopping the communication, it is possible to temporarily release the unnecessary occupation of the facsimile device. However, it is not possible to contribute to the investigation into the cause of the disturbance.

SUMMARY

One of the objects of the present invention is to provide a communication disturbance analysis device and a non-transitory recording medium storing a computer readable which can effectively analyze the cause of the disturbance in accordance with the recorded data of the communication sound.

To achieve at least one of the abovementioned objects, according to an aspect of the present invention, a communication disturbance analysis device reflecting one aspect of the present invention, comprises:

a hardware processor that:
  obtains a first recorded data created by recording a first communication sound at a transmitter in one facsimile communication and a second recorded data created by recording a second communication sound at a receiver in the one facsimile communication,
  detects a silence section from each of the first recorded data and the second recorded data; and
  specifies an extracted section to be extracted as a recoded data to be analyzed from the first recorded data and the second recorded data in accordance with the detected silence section.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a view showing the third table in which the time information relating to the extracted section which is specified in accordance with another standard is additionally registered;

FIG. 9 is a view showing the third table in which the extended extracted section is additionally registered;

FIG. 10 is a view showing the extracted section which is extended so as to include the control signals transmitted in the vicinity of the extracted section in the communication sequence;

FIG. 11 is a view showing the situation in which one silence section is selected from a plurality of silence sections extracted in accordance with the same control signals in one communication and the other silence sections are discarded;

FIG. 12 is a view showing the silence section in case that the line is disconnected in the communication due to the on-hook operation carried out by a user;

DETAILED DESCRIPTION OF PREFERRED EMBODIMENT

Hereinafter, one or more embodiments of the present invention will be described with reference to the drawings. However, the scope of the invention is not limited to the disclosed embodiments.

Figure 1:
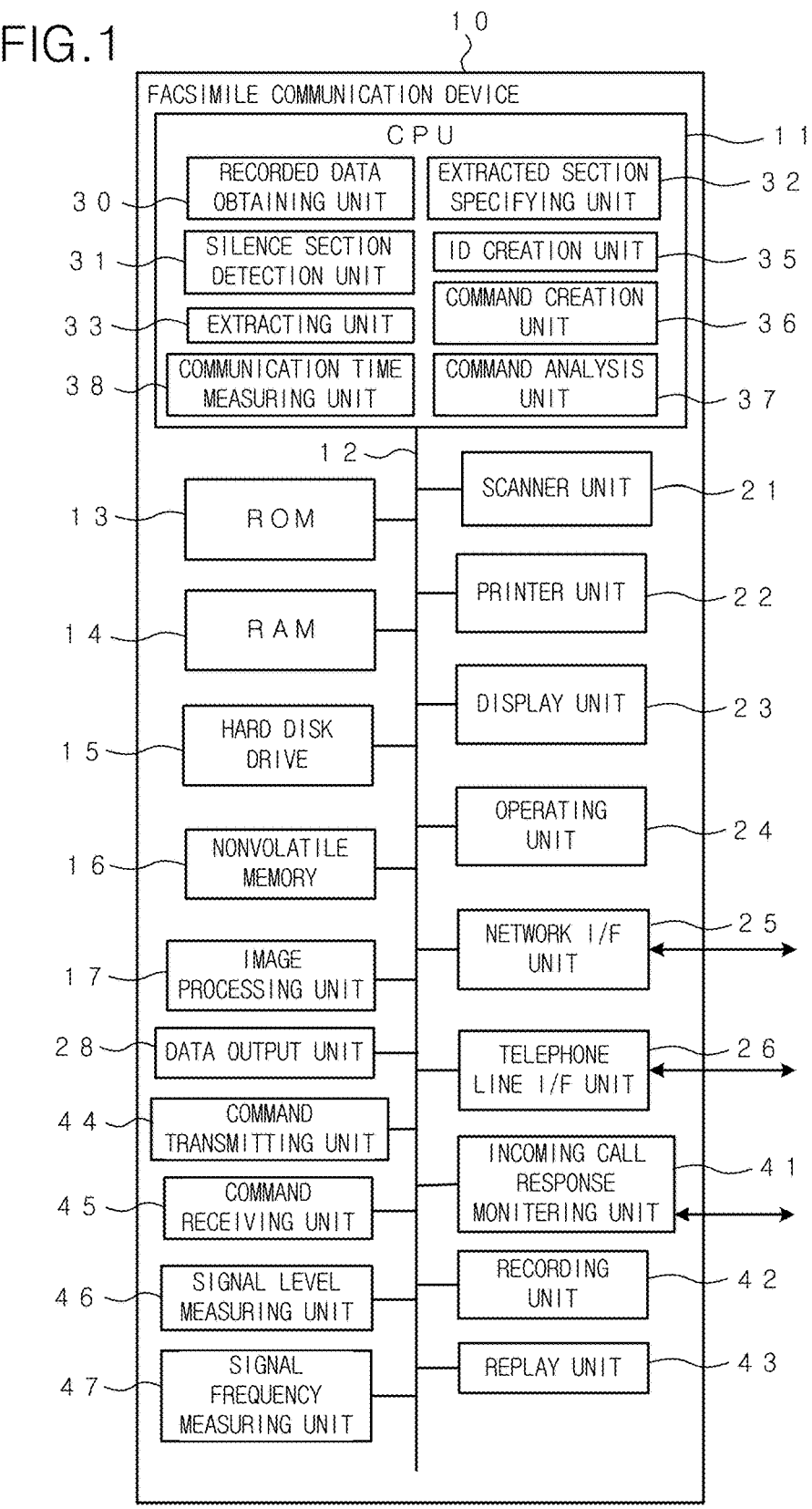
FIG. 1 is a block diagram showing the schematic configuration of the facsimile communication device having the function of the communication disturbance analysis device according to the embodiment.

FIG. 1 is a block diagram showing the schematic configuration of the facsimile communication device 10 having the function of the communication disturbance analysis device according to the embodiment. The facsimile communication device 10 is connected with another facsimile communication device 10 via the communication line including the digital line and the analog line.

The facsimile communication device 10 has the function for recoding the communication sound on the telephone line. The communication disturbance analysis device obtains the recorded data of the transmitter and the recorded data of the receiver in one facsimile communication, and detects the silence section included in the recorded data. Then, the facsimile communication device specifies the part which is effective for the analysis of the communication disturbance (the extracted section which is extracted as the recorded data to be analyzed) among the long recorded data from the start of the communication to the finish of the communication in accordance with the detected silence section, and extracts the recorded data of the extracted section. Thereby, an operator who analyzes the disturbance can analyze the cause of the disturbance by listening to the extracted recorded data, and the like. Further, it is possible to reduce the work for analyzing the disturbance as compared with the case in which the whole of the enormous original recorded data is analyzed.

As shown in FIG. 1, the facsimile communication device 10 comprises a CPU (Central Processing Unit) 11 for entirely controlling the operation of the facsimile communication device 10. The CPU 11 is connected with a ROM (Read Only Memory) 13, a RAM (Random Access Memory) 14, a hard disk drive 15, a nonvolatile memory 16, an image processing unit 17, a scanner unit 21, a printer unit 22, a display unit 23, an operating unit 24, a network I/F unit 25, a telephone line I/F unit 26 and a data output unit 28 via a bus 12.

Further, the facsimile communication device 10 has the incoming call response monitoring unit 41, the recording unit 42, the replay unit 43, the command transmitting unit 44, the command receiving unit 45, the signal level measuring unit 46 and the signal frequency measuring unit 47.

The ROM 13 is a read only memory in which various types of programs and the fixed data are stored. By executing the process in accordance with the programs stored in the ROM 13 by the CPU 11, each function of the facsimile communication device 10 is realized. The RAM 14 is used as a work memory for temporarily storing various types of data when the programs are executed by the CPU 11, an image memory for storing the image data, a buffer memory for the communication, and the like.

The hard disk drive 15 is a large-capacity nonvolatile memory device, and is used for storing or temporarily storing jobs to be executed, other image data to be transmitted, image data received from another facsimile communication device 10 and the like. Further, the hard disk drive 15 is used for storing the recorded data of the communication sound.

The nonvolatile memory 16 is a memory in which the stored contents are maintained even if the facsimile communication device 10 is turned off. In the nonvolatile memory 16, user information, various types of setting information and the like are registered.

The image processing unit 17 executes the process, such as the enlargement/reduction, the resolution conversion, the encoding, the decoding and the like of the image data.

The scanner unit 21 has the function for obtaining image data by optically reading an image of an original. For example, the scanner unit 21 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 22 has the function for printing an image on the recording sheet in accordance with the image data. In this embodiment, the printer unit 22 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The display unit 23 comprises a liquid crystal display and the like, and displays various types of windows, such as the operation window, the setting window and the like. The operating unit 24 comprises various types of buttons, such as a start key, a stop key, a numeric keypad and the like, a touch panel which is provided on the surface of the liquid crystal display and which detects the coordinate position on which the touch panel is pressed, and the like. The operation unit 24 receives various types of operation for the facsimile communication device 10 from a user.

The network I/F unit 25 has the function for communicating with external terminals via the network, such as a LAN (Local Area Network), the Internet and the like. The telephone line I/F unit 26 has the function for connecting with the telephone network for the facsimile communication. The telephone line I/F unit 26 comprises a modem, a tone detection unit, a DAA (Data Access Arrangement) and the like.

The CPU 11 has the function as the recorded data obtaining unit 30, the silence section detection unit 31, the extracted section specifying unit 32, the extracting unit 33, the ID creation unit 35, the command creation unit 36, the command analysis unit 37, the communication time measuring unit 38 and the like.

The incoming call response monitoring unit 41 detects the off-hook of the telephone line in case that the facsimile communication device 10 is a receiver.

The ID creation unit 35 creates the ID (identification information) related to the job when the record instruction command is created.

The command creation unit 36 creates the record instruction command including the ID created by the ID creation unit 35, or the replay instruction command including the optional ID.

The command transmitting unit 44 transmits the command by using the signal, such as DTMF or the like.

The recording unit 42 records the communication sound on the telephone line by fetching the sound from a modular jack neighborhood circuit or a speaker circuit.

The replay unit 43 replays the digitalized sound data by converting it to the analog sound.

The command receiving unit 45 receives the command from the facsimile device of the opposite side.

The command analysis unit 37 analyzes the command received by the command receiving unit 45 and obtains the instruction contents of the command and the ID.

The signal level measuring unit 46 measures the signal level of the signal having the specific frequency from the voltage, the current and the like of the telephone line.

The signal frequency measuring unit 47 measures the frequency of the communication sound on the telephone line. In this embodiment, the signal frequency measuring unit 47 measures the frequency of the signal having the specific frequency by using the band-pass filter and the like.

The communication time measuring unit 38 detects the off-hook and the on-hook, and measures the elapsed time from the start of the communication (off-hook).

The recorded data obtaining unit 30 obtains the recorded data to be analyzed. When the facsimile communication device 10 is the transmitter, the recorded data obtaining unit 30 obtains the recorded data of the receiver. On the other hand, when the facsimile communication device 10 is the receiver, the recorded data obtaining unit 30 obtains the recorded data of the transmitter. Alternatively, in case that the communication to be analyzed is carried out between the facsimile communication devices except the facsimile communication device 10, the recorded data obtaining unit 30 obtains both the recorded data of the transmitter in the above communication and the recorded data of the receiver in the above communication.

The silence section detection unit 31 detects the silence section included in the recorded data which is recorded during the facsimile communication. The extracted section specifying unit 32 specifies the section to be extracted as the recorded data to be analyzed, from the recorded data of the transmitter in one communication and the recorded data of the receiver in the above one communication, respectively, in accordance with the silence section detected by the silence section detection unit 31. The extracting unit 33 extracts the recorded data corresponding to the extracted section specified by the extracted section specifying unit 32. The data output unit 28 outputs the extracted recorded data to an external device.

The communication disturbance analysis device corresponds to the portion including the recorded data obtaining unit 30, the silence section detection unit 31, the extracted section specifying unit 32, the extracting unit 33, the replay unit 43, the signal level measuring unit 46, the signal frequency measuring unit 47, the communication time measuring unit 38 and the data output unit 28. In FIG. 1, the facsimile communication device 10 includes the function of the communication disturbance analysis device. However, the communication disturbance analysis device may be a device which is independent from the facsimile communication device 10.

Figure 2:
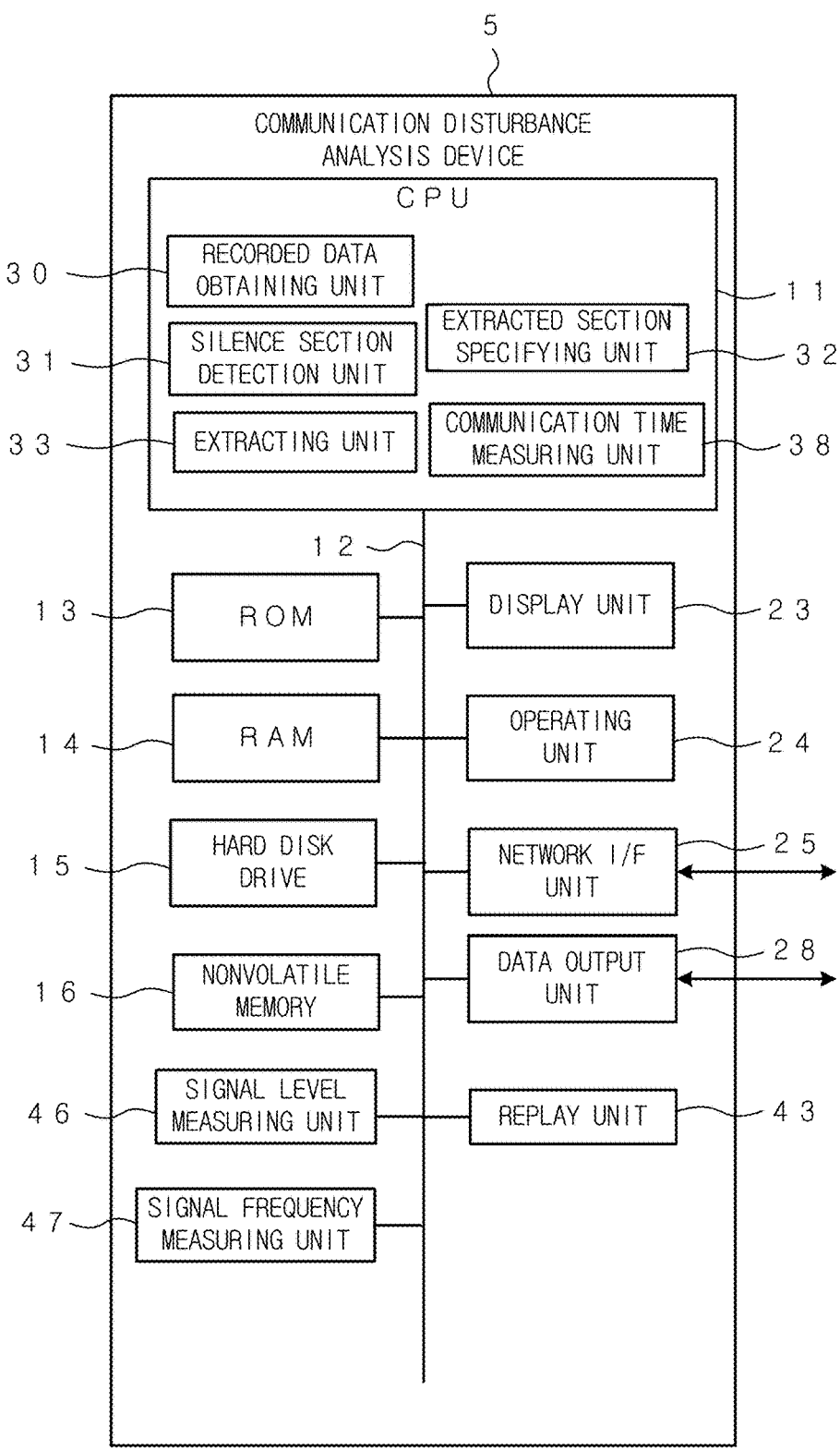
FIG. 2 is a block diagram showing the schematic configuration of the communication disturbance analysis device as an independent device.

FIG. 2 is a block diagram showing the schematic configuration of the communication disturbance analysis device 5 as an independent device. The elements having the same functions as those of the facsimile communication device 10 are denoted by the same numeral references, and the explanation thereof is omitted. Alternatively, the computer program may cause an information processing device to function as the communication disturbance analysis device 5.

<Recording Operation>

The facsimile communication device 10 which functions as the transmitter, creates the ID which is unique to the current facsimile communication job by using the ID creation unit 35. The command creation unit 36 creates the record instruction command including the created ID. The command transmitting unit 44 of the transmitter transmits the record instruction command to the receiver at the start of the facsimile communication or immediately after the start of the facsimile communication. For example, the command transmitting unit 44 transmits the record instruction command by using the DTMF immediately after the receiver carries out the off-hook operation. The facsimile communication device 10 which functions as the transmitter, starts the record from the off-hook operation, and finishes the record at the on-hook operation. The recorded data is stored so as to relate the recorded data to the ID.

The facsimile communication device 10 which functions as the receiver, starts the record when the receiver is called and carries out the off-hook operation. Further, the facsimile communication device 10 which functions as the receiver, records the communication sound during the communication, and finishes the record at the on-hook operation. The command receiving unit 45 of the receiver receives the above-described command transmitted by the transmitter. The command analysis unit 37 analyzes the received command to specify the ID and the contents of the command. Then, the recorded data is stored so as to relate the recorded data to the ID. In case that the above-described command is not received even though the predetermined time elapses from the off-hook, the receiver stops the record and discards the recorded data which is recorded during the current communication.

<Example of Failed Communication>

Figure 3:
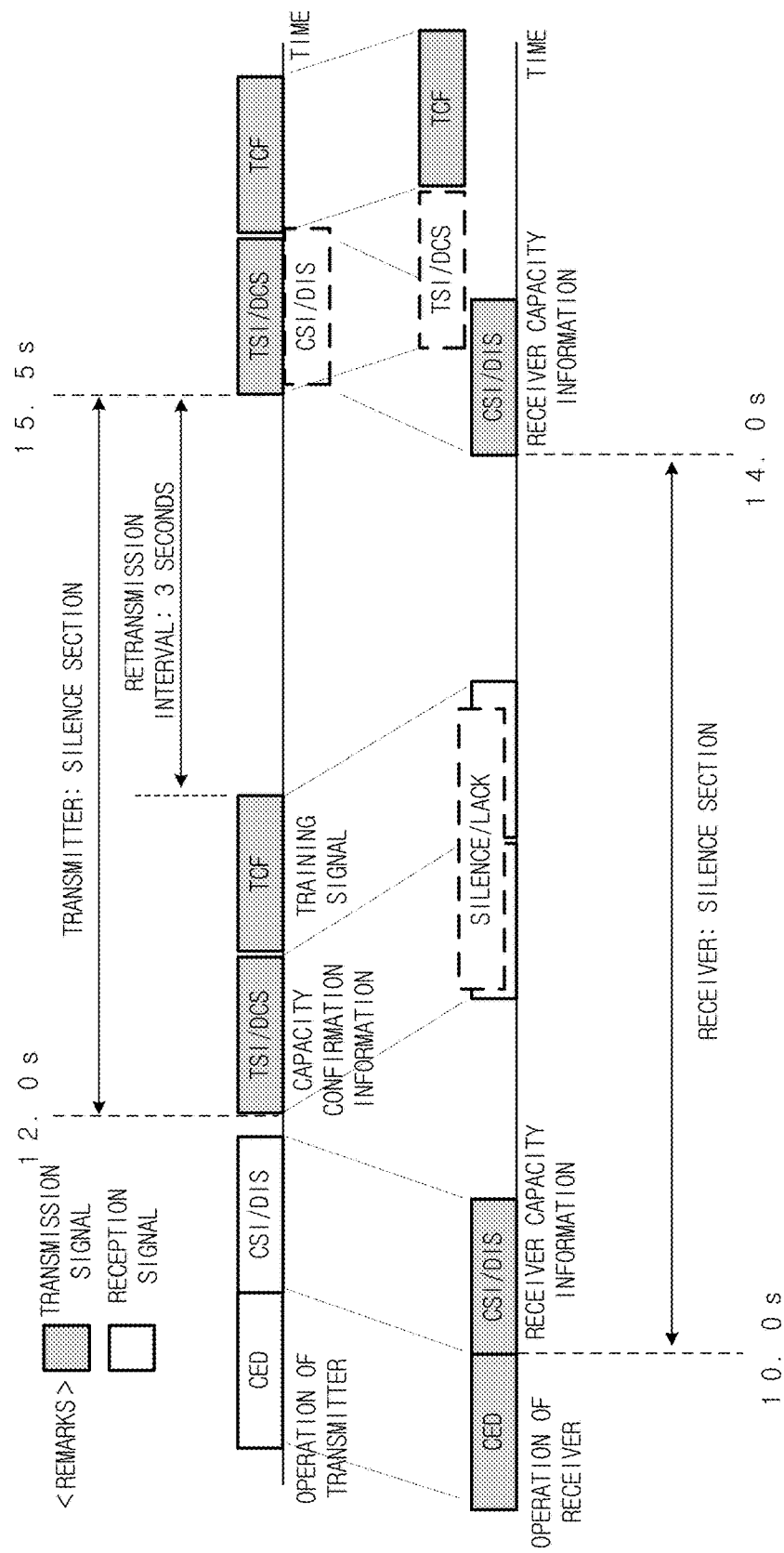
FIG. 3 is a view showing an example of the communication sequence in case that the lack of the signal is caused.

FIG. 3 shows an example of the communication sequence in case that the lack of the signal is caused. In this example, because the lack of TSI/DCS (capacity confirmation information) transmitted by the transmitter or the delay in TSI/DCS is caused in the transmission of TSI/DCS via the IP telephone network, the receiver retransmits CSI/DIS (receiver capacity information). Further, because the transmitter cannot receive CSI/DIS (receiver capacity information) within the predetermined time (retransmission interval: 3 seconds) since the transmitter transmits TSI/DCS (capacity confirmation information), the transmitter retransmits TSI/DCS (capacity confirmation information). In the following explanation, the case in which the recorded data obtained in the communication shown in FIG. 3 is analyzed, will be described.

<Operation of Communication Disturbance Analysis Device>

Firstly, the recorded data of the transmitter and the recorded data of the receiver, which are related to the same ID, are obtained. An optional method for obtaining the recorded data may be used. For example, each facsimile communication device 10 uploads the recorded data to the predetermined server. The communication disturbance analysis device 5 obtains the recoded data of the transmitter and the recorded data of the receiver, which are related to the same ID, from the server by downloading them. Alternatively, one facsimile communication device 10 transmits the request command (including the ID) for obtaining the recorded data, to the facsimile device of the opposite side, and the facsimile device of the opposite side transmits the recorded data which is related to the ID included in the request command.

The silence section detection unit 31 detects the silence section from each recorded data. In this example, the timing of the off-hook operation is set to the reference point (time 0), and the generation timing of the signal having the predetermined signal level or more and the predetermined frequency is measured to specify the silence section.

Basically, after the specific control signal is detected in the facsimile communication procedure, in case that the retransmission of the same specific control signal is detected, the period from the first detection of the specific control signal to the detection of the retransmitted specific control signal (the second detection of the specific control signal) is detected as the silence section.

In this example, the specific control signal is detected in accordance with the signal level and the signal frequency. That is, the signal level of the control signal transmitted from one facsimile communication device is higher than the signal level of the signal received from the facsimile device of the opposite side in the recorded data recorded in the above one facsimile communication device. Therefore, it is judged that the signal having the signal level which is higher than the predetermined threshold value is the control signal transmitted from the facsimile communication device in which the communication sound is recorded. Then, in case that the facsimile communication device in which the communication sound is recorded successively transmits the same control signal, it is judged that the above control signal is retransmitted. The type of the control signal is judged in accordance with the frequency thereof.

In detail, in case that the signal frequency measuring unit 47 judges that the frequency of the first signal having the signal level higher than the predetermined level, which is detected by the signal level measuring unit 46, is the specific frequency, the first signal is recognized as the specific control signal. After the first signal is detected, in case that the signal frequency measuring unit 47 judges that the frequency of the second signal having the signal level higher than the predetermined level, which is detected by the signal level measuring unit 46, is the specific frequency, the second signal is recognized as the retransmitted specific control signal. Then, the period from the detection of the first signal to the detection of the second signal is detected as the silence section.

In the example of FIG. 3, (1) the transmitter measures the waveform of TSI/DCS (capacity confirmation information) as the signal having the predetermined level/frequency (control signal). In FIG. 3, the transmitter detects the above control signal at the point of 12.0 s and the point of 15.5 s, and does not detect the control signal having the signal level higher than the predetermined level between the point of 12.0 s and the point of 15.5 s. The point of 12.0 s at which the first TSI/DCS signal is detected is set to the start timing (the starting point) of the silence section. The point of 15.5 s at which the second TSI/DCS signal is detected is set to the end timing (the ending point) of the silence section. These timings are stored so as to relate the timings to the predetermined ID created by the transmitter.

(2) The receiver measures the waveform of CSI/DIS (receiver capacity information) as the signal having the predetermined level/frequency (control signal). In FIG. 3, the receiver detects the above control signal at the point of 10.0 s and the point of 14.0 s, and does not detect the control signal having the signal level higher than the predetermined level between the point of 10.0 s and the point of 14.0 s. The point of 10.0 s at which the first CSI/DIS signal is detected is set to the start timing (the starting point) of the silence section. The point of 14.0 s at which the second TSI/DCS signal is detected is set to the end timing (the ending point) of the silence section. These timings are stored so as to relate the timings to the ID transmitted from the transmitter at the start of the communication or the like. By the ID, the recorded data of the transmitter in one facsimile communication is related to the recorded data of the receiver in the above one facsimile communication.

Figure 4:
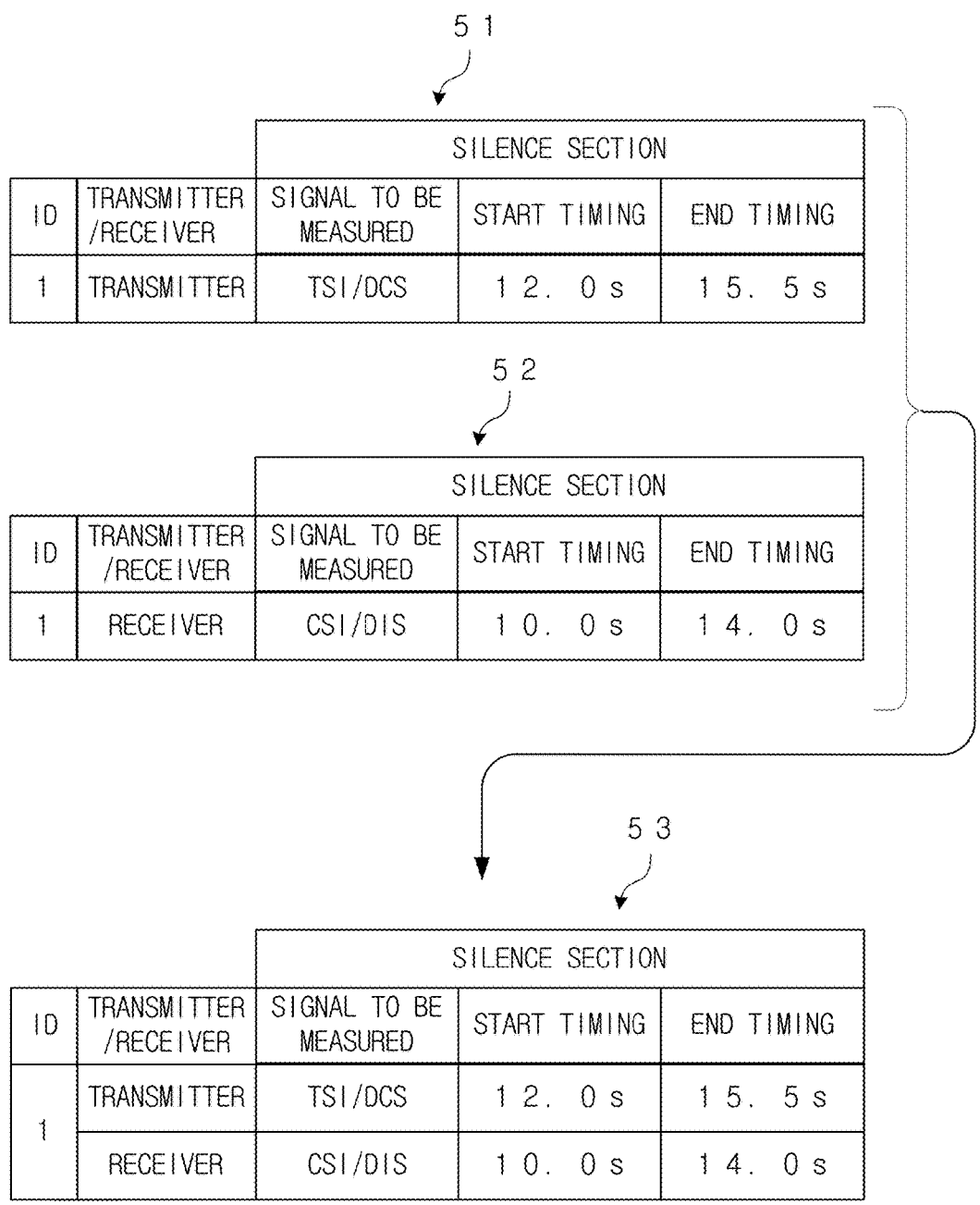
FIG. 4 is a view showing the table in which the information relating to the detected silence section is registered.

FIG. 4 shows the table in which the information relating to the detected silence section is registered. The first table 51 in which the information relating to the start timing and the end timing of the silence section detected in the transmitter by the above process (1) is registered, is prepared. The second table 52 in which the information relating to the start timing and the end timing of the silence section detected in the receiver by the above process (2) is registered, is prepared. Then, by integrating the first table 51 and the second table 52, the third table 53 is prepared.

Next, the extracted section specifying unit 32 specifies the extracted section. In the method for specifying the extracted section, firstly, the extracted section specifying unit 32 confirms the overlapped part of the silence section detected in the transmitter and the silence section detected in the receiver. In case of the example of FIG. 3 and FIG. 4, the period from the point of 12.0 s to the point of 14.0 s is the overlapped part.

Figure 5:
FIG. 5 is a view showing the third table in which the time information relating to the extracted section which is specified in accordance with the predetermined standard is additionally registered.
Figure 6:
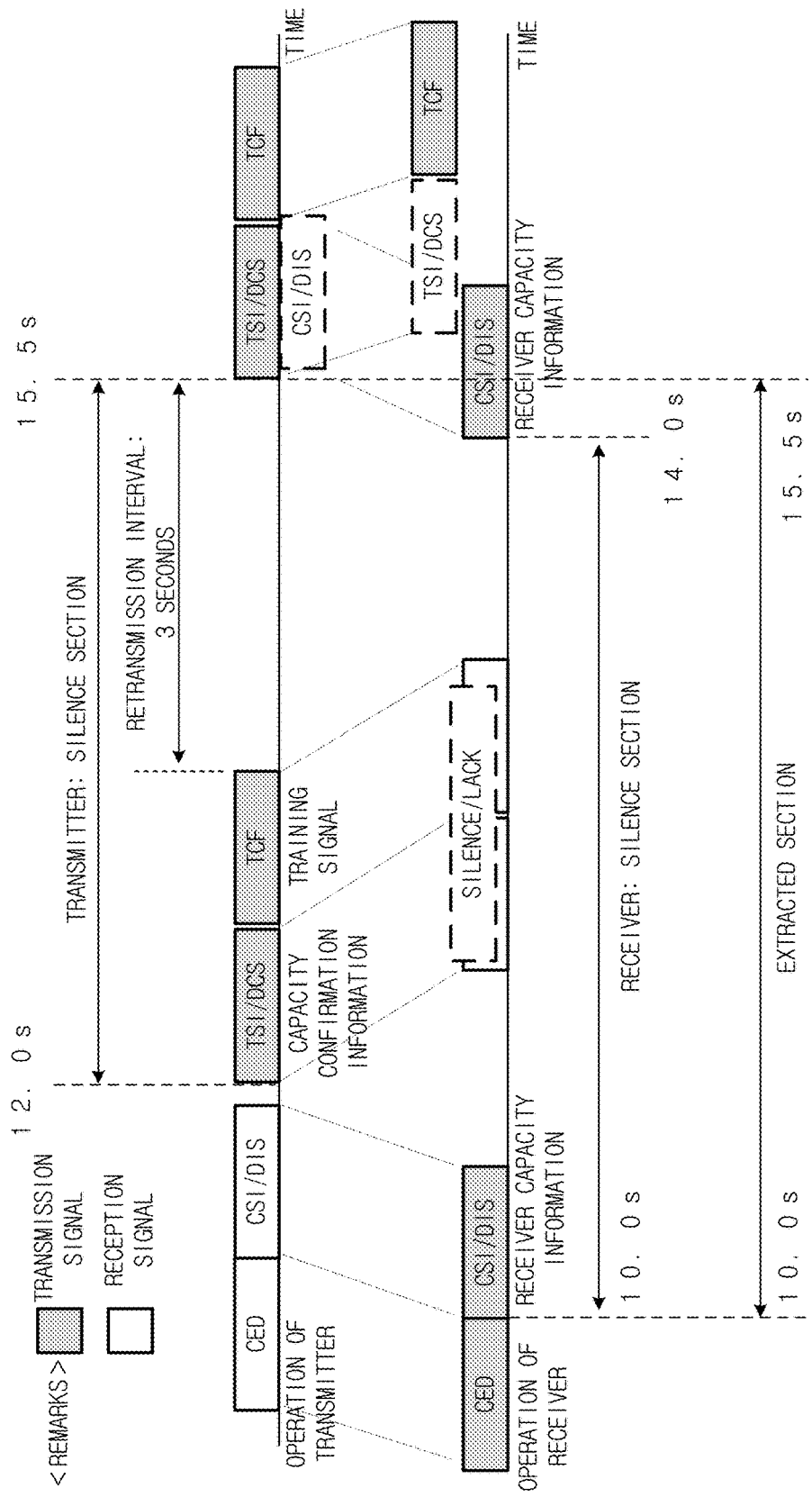
FIG. 6 is a view showing the extracted section which is specified in accordance with the predetermined standard in the communication sequence.

In case that the silence section detected in the transmitter is overlapped with the silence section detected in the receiver, the extracted section specifying unit 32 sets the earlier of the start timing of the silence section detected in the transmitter and the start timing of the silence section detected in the receiver, to the start timing of the extracted section. Further, the extracted section specifying unit 32 sets the later of the end timing of the silence section detected in the transmitter and the end timing of the silence section detected in the receiver, to the end timing of the extracted section. Thereby, the extracted section specifying unit 32 determines the extracted section. Then, the extracted section specifying unit 32 additionally registers the time information relating to the extracted section in the third table 53 (in the row "Reset") (See FIG. 5). FIG. 6 shows the extracted section in the communication sequence. In this example, the start timing of the extracted section is 10.0 s and the end timing of the extracted section is 15.5 s.

The extracting unit 33 extracts the recorded data corresponding to the extracted section from both of the recorded data of the transmitter and the recorded data of the receiver. Then, the extracted recorded data is stored or is output to an external device.

As described above, because the part which is effective for the analysis of the communication disturbance is automatically detected and extracted among the long recorded data from the start of the communication to the finish of the communication, by analyzing the extracted recorded data, it is possible to reduce the work for analyzing the disturbance as compared with the case in which the whole of the enormous original recorded data is analyzed.

Further, because the starting point of the extracted recorded data of the transmitter is coincident with the starting point of the extracted recorded data of the receiver, for example, in the example, both of the starting points are 10.0 s from the off-hook as the reference point, it is possible to easily synchronize the communication sounds in the part which is the cause of the disturbance and to easily compare the recorded data by simultaneously replaying both of the recorded data from the starting point.

Figure 7:
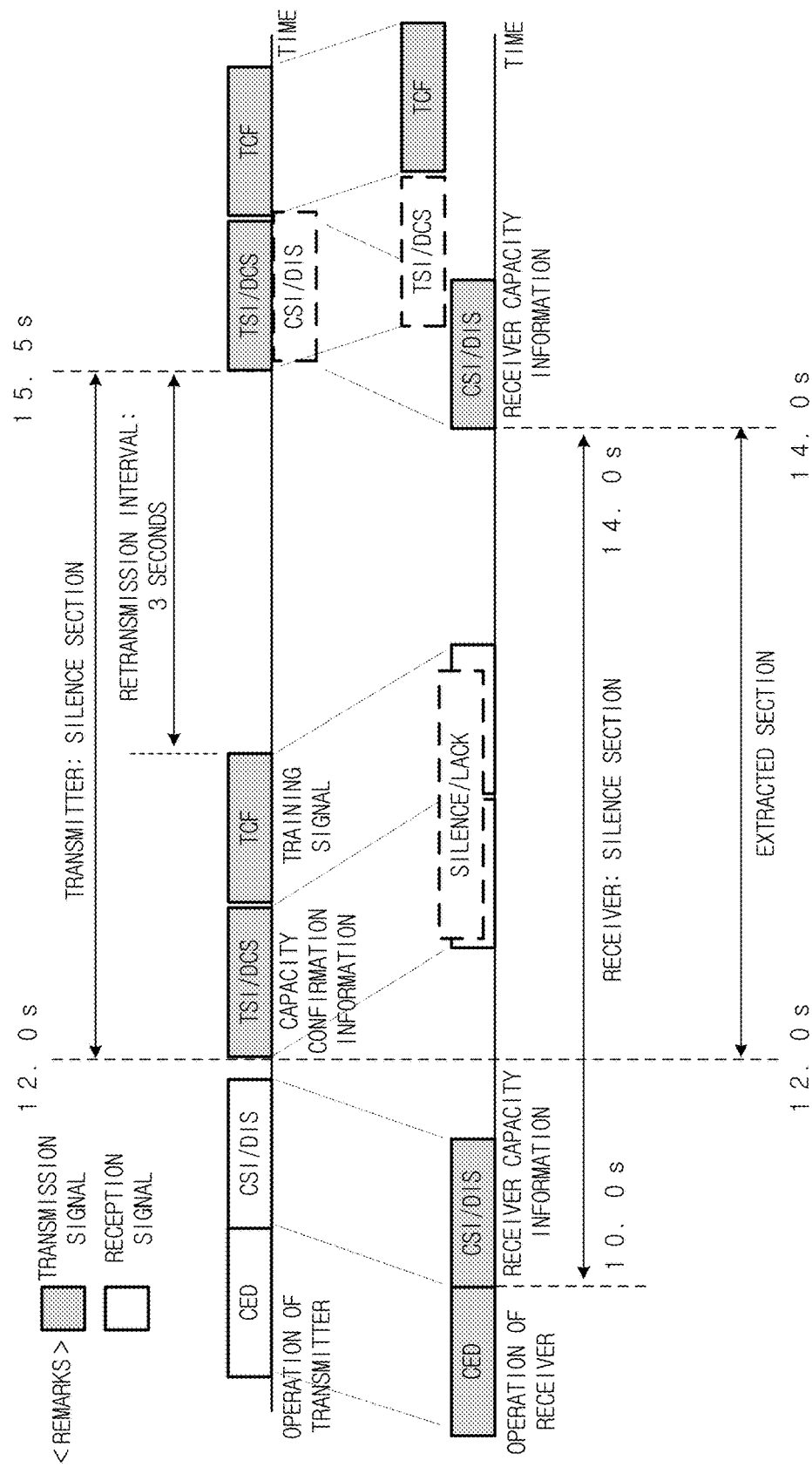
FIG. 7 is a view showing the extracted section which is specified in accordance with another standard in the communication sequence.

FIG. 7 and FIG. 8 show an example in which the extracted section is specified in accordance with another standard. Like the above-described example, firstly, the extracted section specifying unit 32 confirms the overlapped part of the silence section detected in the transmitter and the silence section detected in the receiver.

In case that the silence section detected in the transmitter is overlapped with the silence section detected in the receiver, the extracted section specifying unit 32 sets the later of the start timing of the silence section detected in the transmitter and the start timing of the silence section detected in the receiver, to the start timing of the extracted section. Further, the extracted section specifying unit 32 sets the earlier of the end timing of the silence section detected in the transmitter and the end timing of the silence section detected in the receiver, to the end timing of the extracted section. Thereby, the extracted section specifying unit 32 determines the extracted section. Then, the extracted section specifying unit 32 additionally registers the time information relating to the extracted section in the third table 53 (in the row "Reset") (See FIG. 8). FIG. 7 shows the extracted section in the communication sequence. In this example, the start timing of the extracted section is 12.0 s and the end timing of the extracted section is 14.0 s.

The extracting unit 33 extracts the recorded data corresponding to the extracted section from both of the recorded data of the transmitter and the recorded data of the receiver. Then, the extracted recorded data is stored or is output to an external device.

In addition, in case that the control signal transmitted from one of the transmitter and the receiver at the starting point of the silence section is not detected from the recorded data which is recorded in the other of the transmitter and the receiver, the period from the transmission of the above control signal to the transmission of another control signal from the other of the transmitter and the receiver after the transmission of the above control signal, is specified as the extracted section. For example, in case that the control signal (referred to as "first control signal") transmitted from the transmitter at the starting point of the silence section detected in the transmitter is not detected from the recorded data which is recorded in the receiver, the timing at which the transmitter transmits the first control signal is set to the start timing (the starting point) of the extracted section. Further, the timing at which the receiver transmits the control signal (referred to as "second control signal") after the transmitter transmits the first control signal (the timing at which the second control signal is detected from the recorded data of the receiver), is set to the end timing (the ending point) of the extracted section. Thereby, the period from the starting timing to the ending timing is specified as the extracted section.

In the example of FIG. 7 and FIG. 8, it is judged whether the control signal transmitted from the receiver is detected from the recorded data of the transmitter. In the example of FIG. 7, it is checked whether the CSI/DIS signal transmitted from the receiver at the point of 10.0 s is detected from the recorded data of the transmitter. In this example, it is judged whether the CSI/DIS signal is recorded from the point of 10.0 s to the point of 12.0 s in the recorded data of the transmitter by using the signal level measuring unit 46 and the signal frequency measuring unit 47. In the example of FIG. 7, because the CSI/DIS signal is detected in the period from 10.0 s to 12.0 s from the recorded data of the transmitter, this period is not specified as the extracted section.

Next, it is judged whether the control signal transmitted from the transmitter is detected from the recorded data of the receiver. In the example of FIG. 7, it is checked whether the TSI/DCS signal transmitted from the transmitter at the point of 12.0 s is detected from the recorded data of the receiver. In this example, it is judged whether the TSI/DCS signal is recorded from the point of 12.0 s to the point of 14.0 s in the recorded data of the receiver by using the signal level measuring unit 46 and the signal frequency measuring unit 47. In the example, of FIG. 7, the signal having the predetermined level/frequency is not detected in the period from 12.0 s to 14.0 s. That is, the TSI/DCS signal does not reach the receiver and is lacked. Therefore, the period from the point of 12.0 s at which the transmitter transmits the TSI/DCS signal to the point of 14.0 s at which the receiver transmits the CSI/DIS signal is specified as the extracted section, and the recorded data corresponding to the extracted section is extracted.

Next, the extension of the extracted section will be explained. The extracted section which is specified as shown in FIG. 5 and FIG. 6, is the minimum section. Therefore, there are some cases in which the cause of the disturbance is analyzed more easily if the recorded data which is recorded in the vicinity of the specified extracted section is added. In this example, the extracted section is extended by the predetermined time. For example, the timing calculated by subtracting 0.5 second from the start timing of the original extracted section is set to the start timing of the extended extracted section. Further, the timing calculated by adding 1.0 second to the end timing of the original extracted section is set to the end timing of the extended extracted section. FIG. 9 shows the third table 53 in which the extended extracted section is additionally registered.

Alternatively, the original extracted section is extended so as to include the control signals transmitted in the vicinity of the original extracted section. For example, as shown in FIG. 10, in case that the start timing (10.0 s) of the original extracted section is the timing of the detection of the CSI/DIS signal transmitted from the receiver, the start timing of the extended extracted section is shifted to the timing of the detection of the CED signal which is the control signal preceding the CSI/DIS signal. Further, in case that the end timing (15.5 s) of the original extracted section is the timing immediately before the retransmission of the TSI/DCS signal, the end timing of the extended extracted section is shifted afterward to the finish of the retransmission of the TSI/DCS signal. By including the control signals transmitted in the vicinity of the original extracted section in the recorded data as described above, it is possible to easily grasp the position in the recorded data for the communication. Thereby, an operator is assisted to analyze the disturbance.

The situation in which the control signal is retransmitted due to the delay in the signal or the lack of the signal is repeated in one communication. Therefore, there is some possibility that the silence section which is caused between the same control signals is detected a plurality of times from the recorded data in one communication. In this case, if the recorded data corresponding to any one of the silence sections is extracted, the problem relating to the analysis of the disturbance is not caused.

As shown in FIG. 11, in case that the silence section extracted in accordance with the same control signals is detected a plurality of times in one communication, one silent section is selected (reserved) from the detected silence sections and the other silence sections are discarded. In the example of FIG. 11, the silence section which is caused for the first time is selected (reserved) among the detected silence sections, and the silence sections which are caused for the second or subsequent times are discarded.

As shown in FIG. 12, there are some cases in which the line is disconnected in the communication due to the on-hook operation carried out by a user. In the example of FIG. 12, after the receiver transmits the CSI/DIS signal, the line is disconnected by carrying out the on-hook operation while the receiver waits for the TSI/DCS signal transmitted from the facsimile device of the opposite side.

Normally, because the CSI/DIS signal is retransmitted due to the lack of the TSI/DCS signal, the period from the first transmission of the CSI/DIS signal to the second transmission of the CSI/DIS signal is detected as the silence section. However, when the on-hook operation is carried out before the second transmission of the CSI/DIS signal, the silence section cannot be detected by the method for detecting the silence section as described above. Therefore, in case that after the specific control signal (for example, the CSI/DIS signal) is detected, the on-hook operation (line disconnection) is detected before the control signal to be output next in the facsimile communication procedure (in this case, the TSI/DCS signal to be transmitted from the facsimile device of the opposite side) is detected, the period from the detection of the specific control signal to the on-hook operation is detected as the silence section. Further, in the transmitter, when the transmitter detects the line disconnection, the period from the transmission of the control signal which is transmitted before the line disconnection, to the line disconnection, is detected as the silence section. In this example, the receiver detects the period from the point of 10.0 s to the point of 13.5 s as the silence section, and the transmitter detects the period from the point of 12.0 s to the point of 13.5 s as the silence section.

Figure 13:
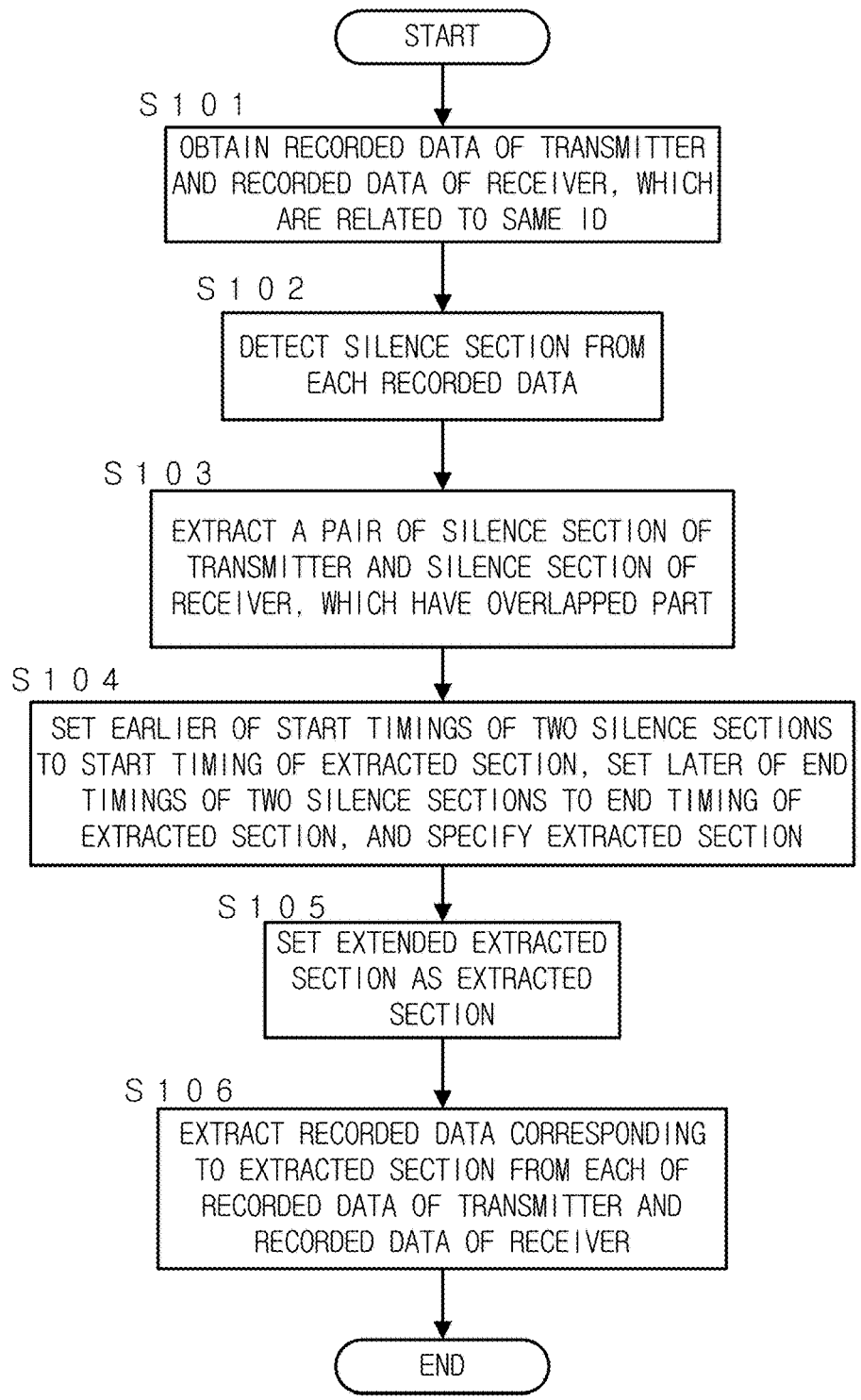
FIG. 13 is a flowchart showing the process for specifying the extracted section, which is carried out by the communication disturbance analysis device (or the communication disturbance analysis device included in the facsimile communication device)
Figure 14:
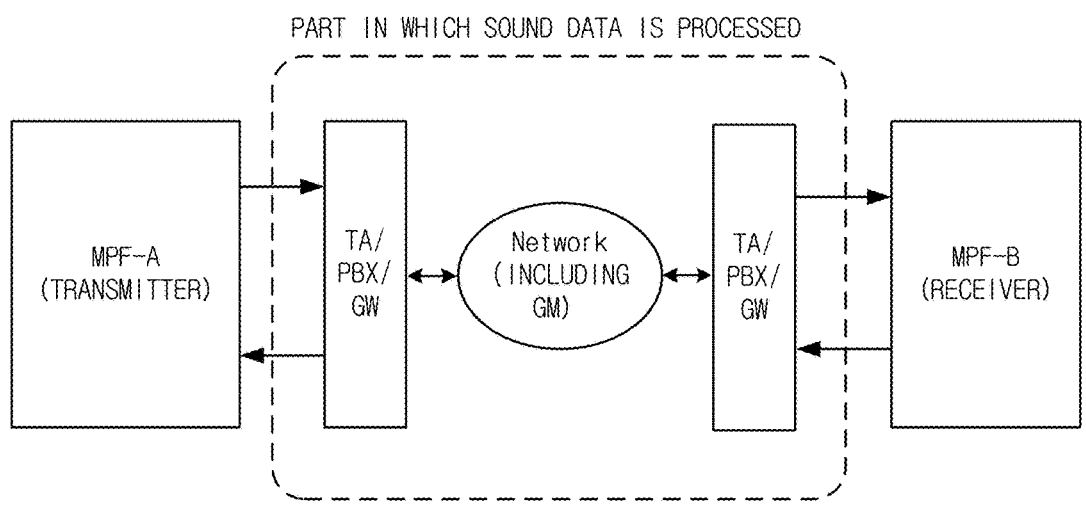
FIG. 14 is a view showing the part in which the sound data is processed in the IP telephone network.
Figure 15:
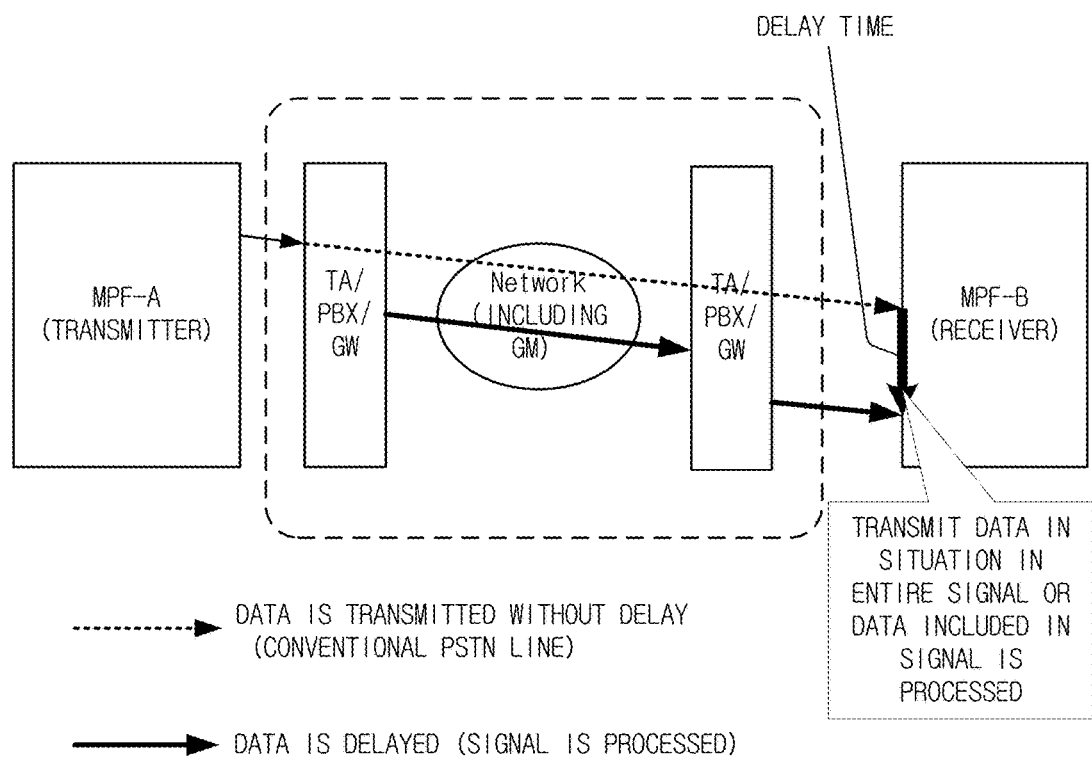
FIG. 15 is a view showing an example of the delay in the signal transmission in the IP telephone network.
Figure 16:
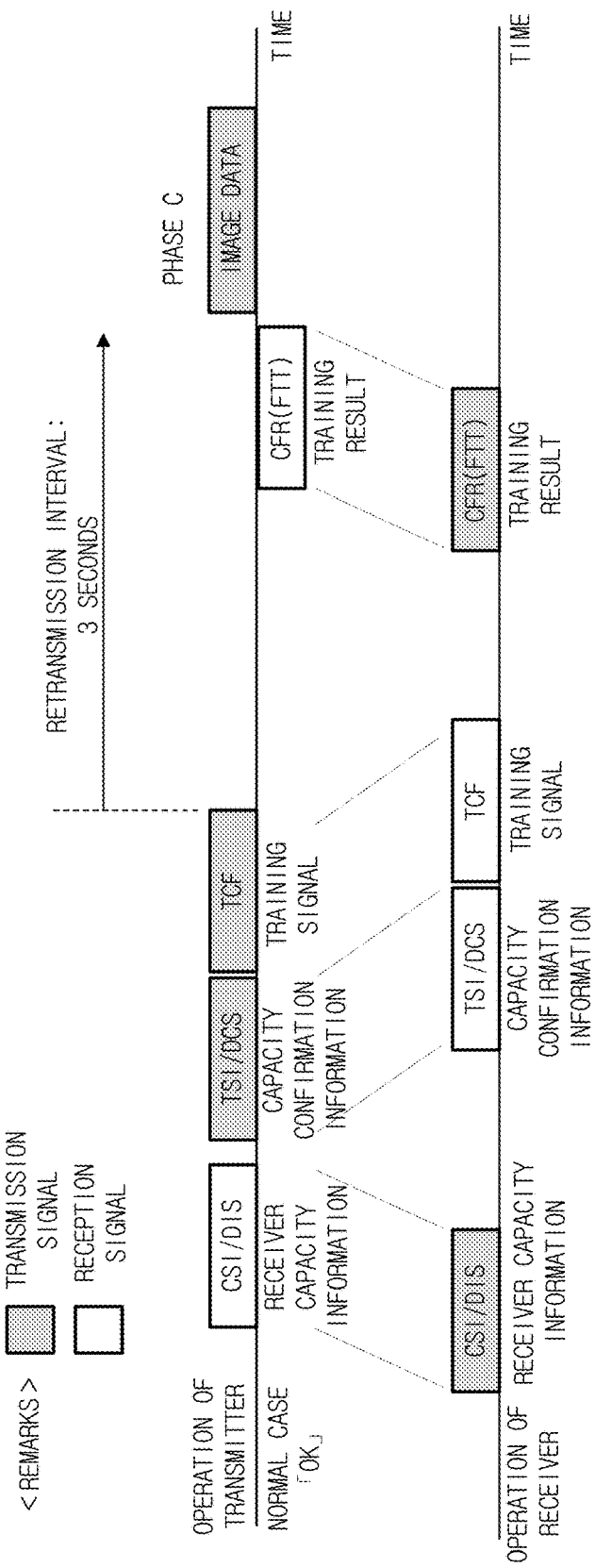
FIG. 16 is a view showing an example of the normal communication procedure (communication sequence)
Figure 17:
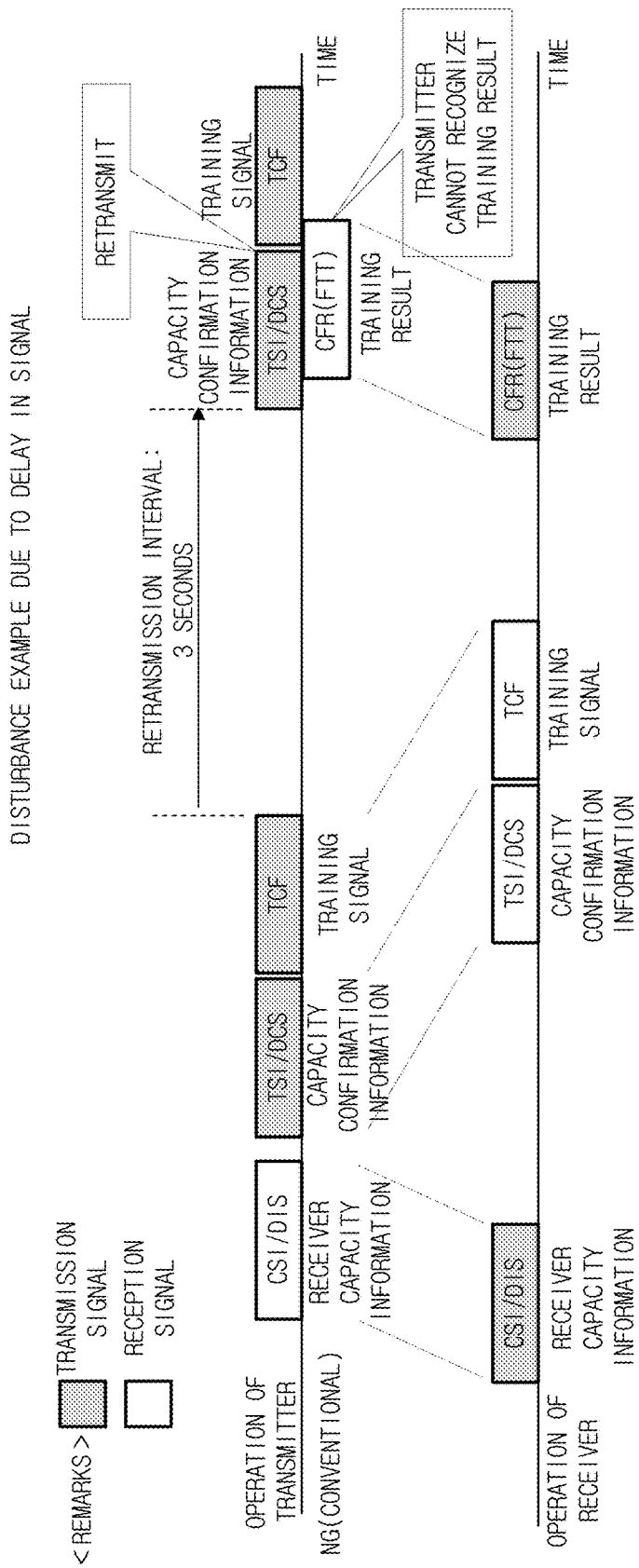
FIG. 17 is a view showing an example of the communication sequence in case that the training result cannot be received from the receiver in the transmitter before the lapse of the retransmission interval.
Figure 18:
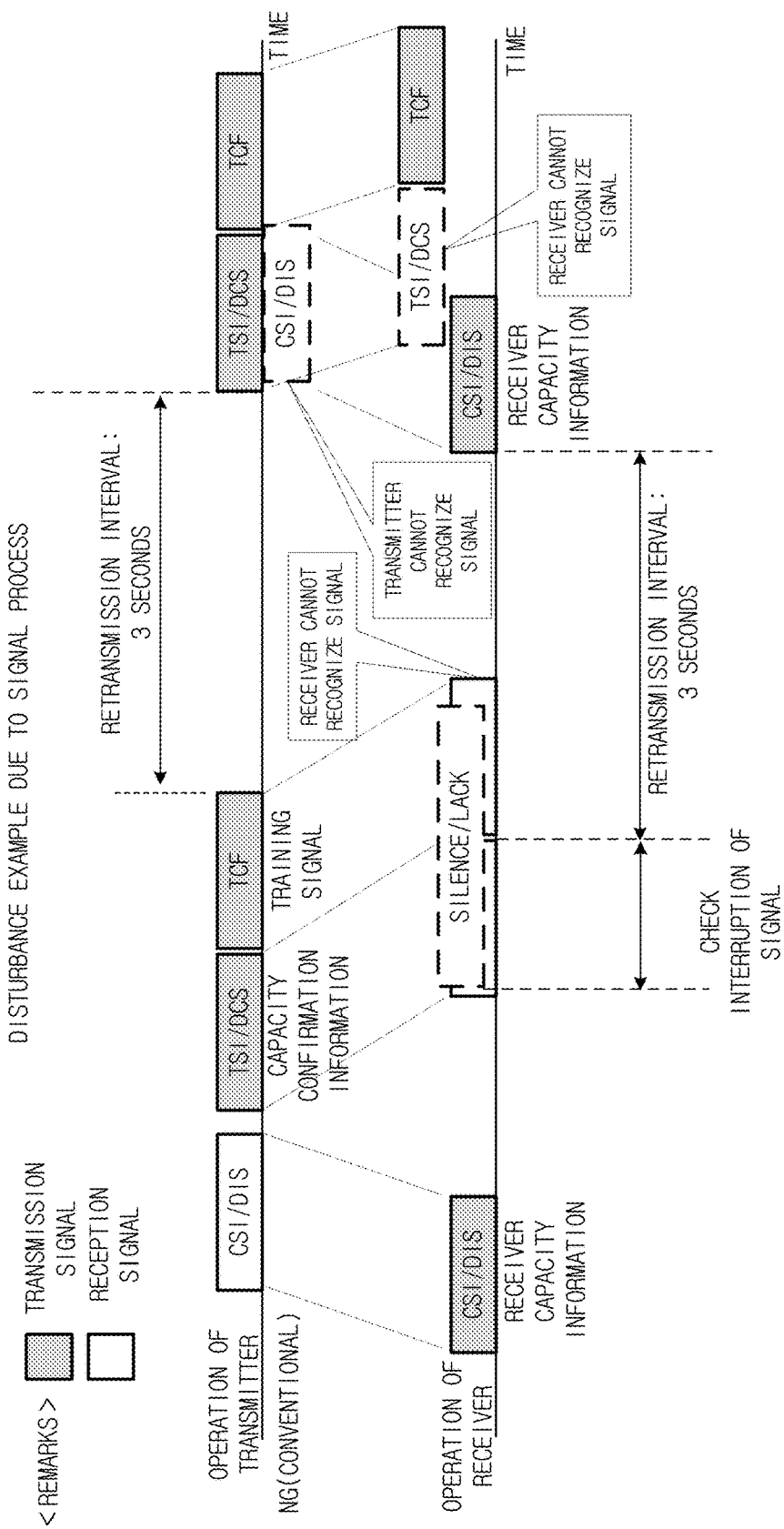
FIG. 18 is a view showing an example of the communication sequence in case that the TSI/DCS and the training signal which are transmitted from the transmitter are lacked in the IP telephone network.

FIG. 13 is a flowchart showing the process for specifying the extracted section, which is carried out by the communication disturbance analysis device 5 (or the communication disturbance analysis device included in the facsimile communication device 10). Firstly, the recorded data of the transmitter and the recorded data of the receiver, which are related to the same ID, are obtained (Step S101). Next, the silence section is detected from each recorded data (Step S102).

It is checked whether the silence section detected from the recorded data of the transmitter is overlapped with the silence section detected from the recorded data of the receiver, and the a pair of the silence sections having the overlapped part is extracted (Step S103).

The earlier of the start timings of two paired silence sections having the overlapped part is set to the start timing of the extracted section. The later of the end timings of the above two paired silence sections is set to the end timing of the extracted section. Thereby, the extracted section is specified (Step S104).

The extracted section is extended by the predetermined time or in accordance with the control signals. Then, the extended extracted section is set as the extracted section (Step S105).

The recorded data corresponding to the set extracted section is extracted from each of the recorded data of the transmitter and the recorded data of the receiver, and is stored (or output) (Step S106). Then, the process is ended.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In case that the facsimile communication device 10 which is the transmitter has the function as the communication disturbance analysis device, the facsimile communication device 10 which is the transmitter may analyze the recorded data. Similarly, in case that the facsimile communication device 10 which is the receiver has the function as the communication disturbance analysis device, the facsimile communication device 10 which is the receiver may analyze the recorded data. Alternatively, the communication disturbance analysis device 5 which is independent from the transmitter and the receiver may analyze the recorded data. Each of the transmitter and the receiver may carry out a part of the analysis of the disturbance, and the transmitter, the receiver or the independent communication disturbance analysis device 5 may carry out the remaining part of the analysis of the disturbance. For example, each of the transmitter and the receiver may carry out the process for the analysis until the silence section is extracted from the recorded data (until the first table 51 and the second table 52 are prepared).

The method for obtaining the recorded data to be analyzed by the transmitter, the receiver or the independent communication disturbance analysis device 5 may be optional. For example, a device in which the recorded data is stored may be instructed to forward the recorded data by transmitting the predetermined command to the above device. Alternatively, the transmitter and the receiver may transmit the recorded data to a server to collect the recorded data in the server, and a device which analyzes the disturbance (the transmitter, the receiver or the independent communication disturbance analysis device 10) may obtain the recorded data from the server.

In the embodiment, the transmitter determines the ID and transmits the determined ID to the receiver. Then, the recorded data of the transmitter and the recorded data of the receiver are related to the same ID, and the recorded data of the transmitter in one communication is related to the recorded data of the receiver in the above one communication by using the ID. The method for relating the recorded data to each other is not limited to this. For example, the date and time of the start of the communication is recorded on each recorded data of the transmitter and the receiver, and by using the above date and time as the information for relating the recorded data, the recorded data of the transmitter may be related to the recorded data of the receiver. In this case, in consideration of the international call, it is preferable to adopt the Greenwich Mean Time (GMT) when the above date and time is recorded. Alternatively, the time difference of the above data and time may be corrected.

In the embodiment, the silence section is extracted from each of the first recorded data in which the communication sound is recorded in the transmitter and the second recorded data in which the communication sound is recorded in the receiver. In accordance with the extracted silence sections, the extracted section which is extracted as the recorded data to be analyzed from the first and the second recorded data is specified. Because the part which is effective for the analysis of the disturbance is automatically extracted from the long recorded data, it is possible to reduce the work for analyzing the disturbance in accordance with the recorded data.

In the embodiment, because the control signal is transmitted from the transmitter and the receiver alternately in the facsimile communication, in case that after one of the transmitter and the receiver transmits the specific control signal, the above one of the transmitter and the receiver retransmits the same specific control signal without receiving the control signal from the facsimile device of the opposite side, the period from the transmission of the specific control signal to the retransmission of the same specific control signal is detected as the silence section.

In the embodiment, in the recorded data which is recorded in one of the transmitter and the receiver, the signal level of the control signal transmitted from the above one of the transmitter and the receiver is higher than the signal level of the control signal received from the facsimile device of the opposite side. Further, the type of the control signal is judged in accordance with the frequency of the signal. Therefore, in case that the frequency of the signal having the signal level exceeding the predetermined threshold value, which is detected next after the signal (the first signal)

having the specific frequency and the signal level exceeding the predetermined threshold value is detected, is the same as the frequency of the signal which is previously detected, it is judged that the same control signal is retransmitted. Further, the period from the detection of the first signal to the detection of the second signal is detected as the silence section.

In the embodiment, even when the line is disconnected due to the on-hook operation which is manually carried out by a user or the like, the silence section can be detected.

In the embodiment, in case that the silence section detected from the first recorded data is overlapped with the silence section detected from the second recorded data, the period including at least one of the silence sections is specified as the section to be extracted.

In the embodiment, in case that the silence section detected from the first recorded data is overlapped with the silence section detected from the second recorded data, the period in which both of the silence sections are overlapped is specified as the section to be extracted.

In the embodiment, in case that the control signal transmitted from one of the communication devices at the starting point of the silence section is not detected from the recorded data recorded in the other of the communication devices, it is judged that the lack of the signal or the delay in the signal is caused. The period in which the lack of the signal or the delay in the signal is included is specified as the extracted section.

In the embodiment, by including the recorded data which is recorded in the vicinity of the original extracted section which is originally specified, in the extracted section, it is possible to easily analyze the cause of the disturbance.

In the embodiment, in case that the same phenomenon is caused a plurality of times, the recorded data for one time of the phenomenon is sufficient for the analysis of the disturbance. Therefore, by selecting (reserving) the recorded data for one time of the phenomenon and discarding the recorded data for the remaining same phenomenon, it is possible to effectively narrow the recorded data to be analyzed.

In the embodiment, because the off-hook operation is clarified as the reference point of the start of the communication, the starting point and the ending point of the silence section and those of the extracted section are expressed by the time information obtained by measuring the time based on the off-hook operation.

According to the communication disturbance analysis device and the non-transitory recording medium storing a computer readable, it is possible to effectively analyze the cause of the disturbance in accordance with the recorded data of the communication sound.

Although embodiments of the present invention have been described and illustrated in detail, it is clearly understood that the same is by way of illustration and example only and not limitation, the scope of the present invention should be interpreted by terms of the appended claims.

What is claimed is:

1. A communication disturbance analysis device, comprising:
a hardware processor that:
obtains a first recorded data created by recording a first communication sound at a transmitter in one facsimile communication and a second recorded data created by recording a second communication sound at a receiver in the one facsimile communication, detects a silence section from each of the first recorded data and the second recorded data; and specifies an extracted section to be extracted as a recorded data to be analyzed from the first recorded data and the second recorded data in accordance with an overlapped part of the silence section in the first recorded data and the silence section in the second recorded data.

2. The communication disturbance analysis device of claim 1, wherein in case that the hardware processor detects a line disconnection after a specific control signal is detected and before a control signal to be output next to the specific control signal in the facsimile communication procedure is detected, the hardware processor detects a period from the detection of the specific control signal until the line disconnection, as the silence section.

3. The communication disturbance analysis device of claim 1, wherein in case that there is an overlapped period between a first silence section detected from the first recorded data and a second silence section detected from the second recorded data, the hardware processor specifies the extracted section which is commonly applied to the first recorded data and the second recorded data, by setting earlier of a start timing of the first silence section and a start timing of the second silence section, to a start timing of the extracted section, and by setting later of an end timing of the first silence section and an end timing of the second silence section, to an end timing of the extracted section.

4. The communication disturbance analysis device of claim 1, wherein in case that there is an overlapped period between a first silence section detected from the first recorded data and a second silence section detected from the second recorded data, the hardware processor specifies the extracted section which is commonly applied to the first recorded data and the second recorded data, by setting later of a start timing of the first silence section and a start timing of the second silence section, to a start timing of the extracted section, and by setting earlier of an end timing of the first silence section and an end timing of the second silence section, to an end timing of the extracted section.

5. The communication disturbance analysis device of claim 1, wherein in case that a first control signal transmitted at a start timing of the silence section by one of the transmitter and the receiver is not detected from the first recorded data or the second recorded data created at the other of the transmitter and the receiver, the hardware processor specifies a period since the one of the transmitter and the receiver transmits the first control signal until the other of the transmitter and the receiver transmits another control signal after the first control signal is transmitted, as the extracted section.

6. The communication disturbance analysis device of claim 3, wherein the hardware processor extends the extracted section so as to advance the start timing of the extracted section and postpone the end timing of the extracted section by a predetermined time or so as to include control signals detected before the start timing of the extracted section and after the end timing of the extracted section.

7. The communication disturbance analysis device of claim 1, wherein in case that the hardware processor detects a plurality of the silence sections in which the same specific control signal is detected at a start timing of the silence section, the hardware processor reserves one silence section and discards the other silence sections.

8. The communication disturbance analysis device of claim 1, wherein the silence section and the extracted section are expressed by time information obtained by measuring time based on an off-hook operation.

9. The communication disturbance analysis device of claim 1, wherein the hardware processor extracts the recorded data corresponding to the extracted section from each of the first recorded data and the second recorded data.

10. A non-transitory recording medium storing a computer readable program which is executed by an information processing device,
wherein the program causes the information processing device to:
obtain a first recorded data created by recording a first communication sound at a transmitter in one facsimile communication and a second recorded data created by recording a second communication sound at a receiver in the one facsimile communication;
detect a silence section from each of the first recorded data and the second recorded data; and
specify an extracted section to be extracted as a recorded data to be analyzed from the first recorded data and the second recorded data in accordance with an overlapped part of the silence section in the first recorded data and the silence section in the second recorded data.

11. The non-transitory recording medium of claim 10, wherein in case that a line disconnection is detected after a specific control signal is detected and before a control signal to be output next to the specific control signal in the facsimile communication procedure is detected, the program causes the information processing device to detect a period from the detection of the specific control signal until the line disconnection, as the silence section.

12. The non-transitory recording medium of claim 10, wherein in case that there is an overlapped period between a first silence section detected from the first recorded data and a second silence section detected from the second recorded data, the program causes the information processing device to specify the extracted section by setting earlier of a start timing of the first silence section and a start timing of the second silence section, to a start timing of the extracted section, and by setting later of an end timing of the first silence section and an end timing of the second silence section, to an end timing of the extracted section.

13. The non-transitory recording medium of claim 10, wherein in case that there is an overlapped period between a first silence section detected from the first recorded data and a second silence section detected from the second recorded data, the program causes the information processing device to specify the extracted section by setting later of a start timing of the first silence section and a start timing of the second silence section, to a start timing of the extracted section, and by setting earlier of an end timing of the first silence section and an end timing of the second silence section, to an end timing of the extracted section.

14. The non-transitory recording medium of claim 10, wherein in case that a first control signal transmitted at a start timing of the silence section by one of the transmitter and the receiver is not detected from the first recorded data or the second recorded data created at the other of the transmitter and the receiver, the program causes the information processing device to specify a period since the one of the transmitter and the receiver transmits the first control signal until the other of the transmitter and the receiver transmits another control signal after the first control signal is transmitted, as the extracted section.

15. The non-transitory recording medium of claim 12, wherein the program causes the information processing device to extend the extracted section so as to advance the start timing of the extracted section and postpone the end timing of the extracted section by a predetermined time or so as to include control signals detected before the start timing of the extracted section and after the end timing of the extracted section.

16. The non-transitory recording medium of claim 10, wherein in case that the information processing device detects a plurality of the silence sections in which the same specific control signal is detected at a start timing of the silence section, the program causes the information processing device to reserve one silence section and discard the other silence sections.

17. The non-transitory recording medium of claim 10, wherein the silence section and the extracted section are expressed by time information obtained by measuring time based on an off-hook operation.

18. The non-transitory recording medium of claim 10, wherein the program causes the information processing device to extract the recorded data corresponding to the extracted section from each of the first recorded data and the second recorded data.

19. A communication disturbance analysis device, comprising:
a hardware processor that:
obtains a first recorded data created by recording a first communication sound at a transmitter in one facsimile communication and a second recorded data created by recording a second communication sound at a receiver in the one facsimile communication,
detects a silence section from each of the first recorded data and the second recorded data; and
specifies an extracted section to be extracted as a recorded data to be analyzed from the first recorded data and the second recorded data in accordance with the detected silence section;
wherein in case that after the hardware processor detects a specific control signal in a facsimile communication procedure, the hardware processor detects a retransmission of the specific control signal, the hardware processor detects a period from a detection of the specific control signal until a detection of the retransmission of the specific control signal, as the silence section; and
a signal level measurer and a signal frequency measurer,
wherein in case that a frequency of a first signal having a predetermined level or more detected by the signal level measurer is judged as a specific frequency by the signal frequency measurer, the hardware processor recognizes the first signal as the specific control signal,
in case that a frequency of a second signal having the predetermined level or more detected by the signal level measurer next to the first signal is judged as the specific frequency by the signal frequency measurer, the hardware processor recognizes the second signal as the specific control signal which is retransmitted, and
the hardware processor detects a period from a detection of the first signal until a detection of the second signal, as the silence section.

20. A non-transitory recording medium storing a computer readable program which is executed by an information processing device,
wherein the program causes the information processing device to:
obtain a first recorded data created by recording a first communication sound at a transmitter in one facsimile communication and a second recorded data created by recording a second communication sound at a receiver in the one facsimile communication;

detect a silence section from each of the first recorded data and the second recorded data; and specify an extracted section to be extracted as a recorded data to be analyzed from the first recorded data and the second recorded data in accordance with the detected silence section, wherein in case that after a specific control signal is detected in a facsimile communication procedure, a retransmission of the specific control signal is detected, the program causes the information processing device to detect a period from a detection of the specific control signal until a detection of the retransmission of the specific control signal, as the silence section, wherein the information processing device comprises a signal level measurer and a signal frequency measurer, in case that a frequency of a first signal having a predetermined level or more detected by the signal level measurer is judged as a specific frequency by the signal frequency measurer, the first signal is recognized as the specific control signal, in case that a frequency of a second signal having the predetermined level or more detected by the signal level measurer next to the first signal is judged as the specific frequency by the signal frequency measurer, the second signal is recognized as the specific control signal which is retransmitted, and the program causes the information processing device to detect a period from a detection of the first signal until a detection of the second signal, as the silence section.

* * * * *